(12) United States Patent
Benosman

(10) Patent No.: US 9,182,753 B2
(45) Date of Patent: Nov. 10, 2015

(54) MODEL-BASED LEARNING CONTROL

(75) Inventor: Mouhacine Benosman, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 604 days.

(21) Appl. No.: 13/468,416

(22) Filed: May 10, 2012

(65) Prior Publication Data

US 2013/0304236 A1 Nov. 14, 2013

(51) Int. Cl.
*G05B 13/04* (2006.01)
*G05B 17/02* (2006.01)
*B66B 1/32* (2006.01)

(52) U.S. Cl.
CPC . *G05B 17/02* (2013.01); *B66B 1/32* (2013.01); *G05B 13/042* (2013.01)

(58) Field of Classification Search
USPC .......................................................... 700/31
See application file for complete search history.

(56) References Cited

U.S. PATENT DOCUMENTS

| | | | |
|---|---|---|---|
| 5,424,942 A * | 6/1995 | Dong et al. | 700/44 |
| 6,098,010 A | 8/2000 | Krener et al. | |
| 2011/0276180 A1* | 11/2011 | Seem | 700/275 |
| 2012/0022700 A1* | 1/2012 | Drees et al. | 700/276 |
| 2012/0035747 A1* | 2/2012 | Gao | 700/29 |

FOREIGN PATENT DOCUMENTS

JP 10091211 A 10/1998

* cited by examiner

*Primary Examiner* — Mohammad Ali
*Assistant Examiner* — John Park
(74) *Attorney, Agent, or Firm* — Dirk Brinkman; Gene Vinokur

(57) ABSTRACT

A method controls an operation of a system. The system is operated by a controller. The controller is model-based controller determined according to a model of the system. The method updates the model, during the operation, based on an extremum seeking, and updates the controller based on the updated model.

8 Claims, 9 Drawing Sheets

200

500

600

700

MODEL-BASED LEARNING CONTROL

FIELD OF THE INVENTION

This invention relates generally to controlling an operation of a system based on a model of the system, and more particularly to updating the model of the system based on an extremum seeking.

BACKGROUND OF THE INVENTION

FIG. 1A shows a schematic representation of an exemplar actuator. The actuator of FIG. 1A is an electromagnetic actuator. The actuator includes a casing 103, two coils 104, two springs 105, rubber cushions 102, a moving element (ME) 101, and a fixed element 100.

Usually, the ME 101 comes in contact with the fixed mechanical element 100 when the actuator is not actuated. To move the ME 101 towards the casing 103, the actuator system is actuated by injecting a current in the coil 104. When the current is cancelled, the ME is pushed against the fixed element 100 by a spring force generated by the springs 102 positioned between the actuator casing 103 and the ME 101. To dampen the contact force, rubber cushions 102 are inserted between the ME and the casing.

FIG. 1B shows another example of the actuator used in an elevator brake system. In this example, a fixed element 110 is curved and represents an elevator brake wheel 120. The fixed element that comes in contact with the elevator brake system is called an elevator drum. Usually, the elevator wheel has two symmetrical elevator brake systems 130. The two elevator brake systems are identical and similarly controlled. For illustration purposes, the elevator brake system is enlarged 140, and schematically shown 150. The ME 155 is also curved to be consistent with the shape of the elevator drum. The rest of the system elements remain in place.

The elevator brake system should be capable of developing relatively large torques and be able to quickly stop the elevator car and counterweight. Additionally, brakes systems can be located near building occupiers, so quiet brake operation is necessary. Furthermore, because the location of the brakes is not always easily accessible, an emphasis is placed on a reliable brake system that is easy to adjust and maintain.

In one method [U.S. Pat. No. 5,717,174], the brake is controlled by position sensor feedback, and the controller adjusts the voltage signal controlling the ME motion to minimize impact velocities. However, there is no quantitative prediction of the achievable performances with respect to the system aging. Moreover, the electronic circuit controls the brake ME in both directions, against the spring force to slow-down the ME motion, and towards the spring force to accelerate the ME motion towards the drum.

Some systems use an extremum seeking controller to enhance system performance. For example, one method [U.S. Pat. No. 8,027,742 B2] uses extremum seeking to generate a control signal that controls directly one actuators of the process, e.g. a mechanical valve or a mechanical damper. In this method, the extremum seeking disturbs one output of the process to detect the fault in the process.

Another methods [U.S. Pat. No. 7,827,831 B2 and U.S. Pat. No. 8,096,140 B2] use extremum seeking to learn set-points of a process of a system. However, it would also be advantageous to provide a system that uses an extremum seeking to further enhance performance the system.

SUMMARY OF THE INVENTION

It is an object of various embodiments of an invention to provide a system and a method for controlling an operation of an actuator. For example, the actuator can be used in a break system of an elevator. It is further object of some embodiment to provide such method that reduces noise generated by the break system, minimizes a cost of installation and maintenance of the brake system, and is adaptive to deterioration of the elements of the break system.

Some embodiments of the invention are based on another realization that it is advantageous to control the motion of the ME based on a model of the actuator. Such realization allows minimizing a number of sensors monitoring the operation of the actuator, and thus reducing the cost of installation and maintenance of the actuator. For example, in one embodiment, only one sensor is used to sense a current in a coil of the actuator. The actual position of the ME is determined based on the measured current and the model of the actuator. This embodiment also reduces the cost of installation and maintenance of the brake system.

One of the difficulties in controlling the break system is to ensure the robustness of the control with respect to the system deterioration. Indeed, during the lifetime of the brake system, the successive brake closing and opening might cause, e.g., changes of the spring constants, as well as changes of the damping characteristics of the rubber cushions. Thus, some embodiments of the invention update the controller during the operation of the actuator. For example, one embodiment updates gains of the nonlinear controller in response to the operation of the actuator. Another embodiment modifies the model of the system and then uses the modified model to update the nonlinear controller. The update of the controller minimizes noise and wear and tear of the brake system.

Accordingly, one embodiment discloses a method for controlling an operation of a system. The method includes operating the system by a controller, wherein the controller is model-based controller determined according to a model of the system, updating the model during the operation based on an extremum seeking; and updating the controller based on the updated model, wherein steps of the method are performed by a processor.

Another embodiment discloses a controller for controlling an operation of a system. The controller includes a processor for executing a learning module, wherein the learning module updates a model of the system using an extremum seeking.

Yet another embodiment discloses a method for controlling an operation of a system. The method includes updating a coefficient of a model of the system based on an extremum seeking. The steps of the method are performed by a processor.

DETAILED DESCRIPTION OF THE PREFERRED EMBODIMENT

Figure 1A:
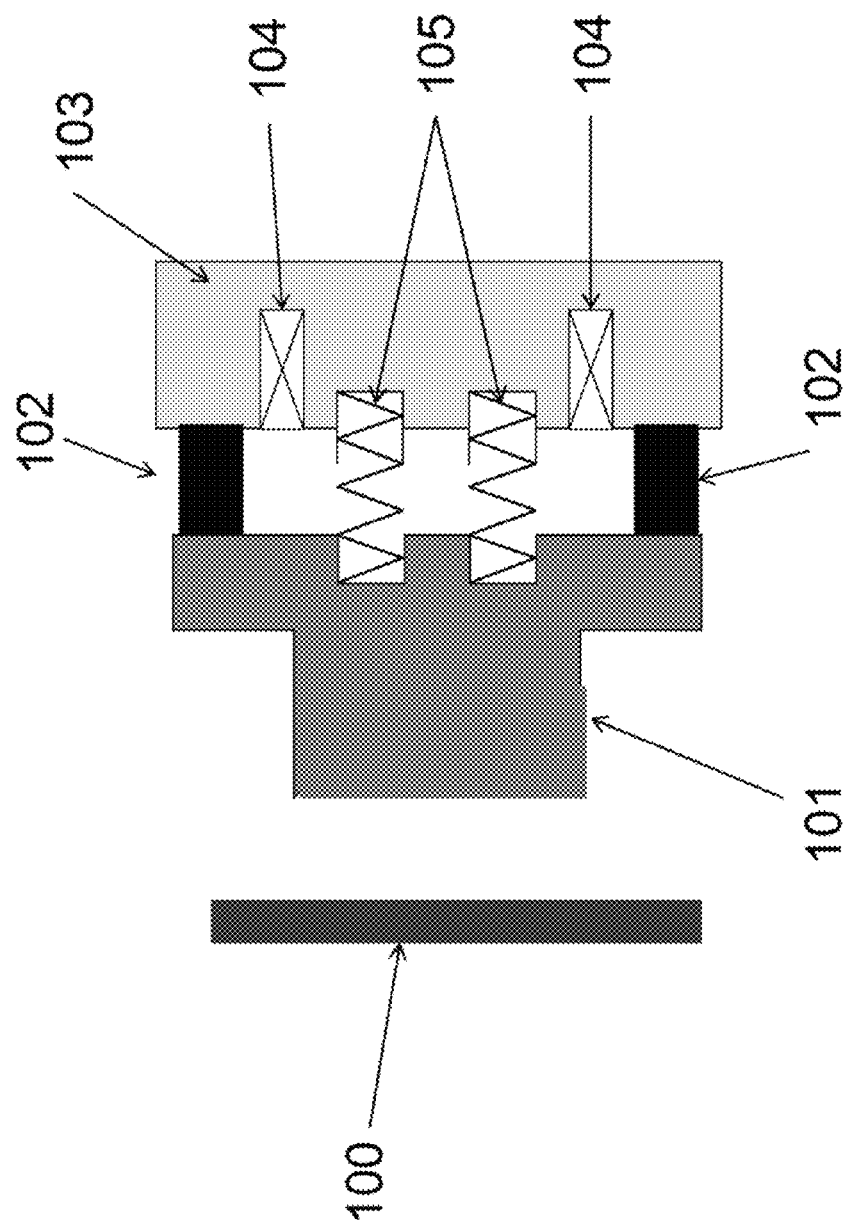
FIG. 1A is a schematic view of a conventional actuator system.
Figure 1B:
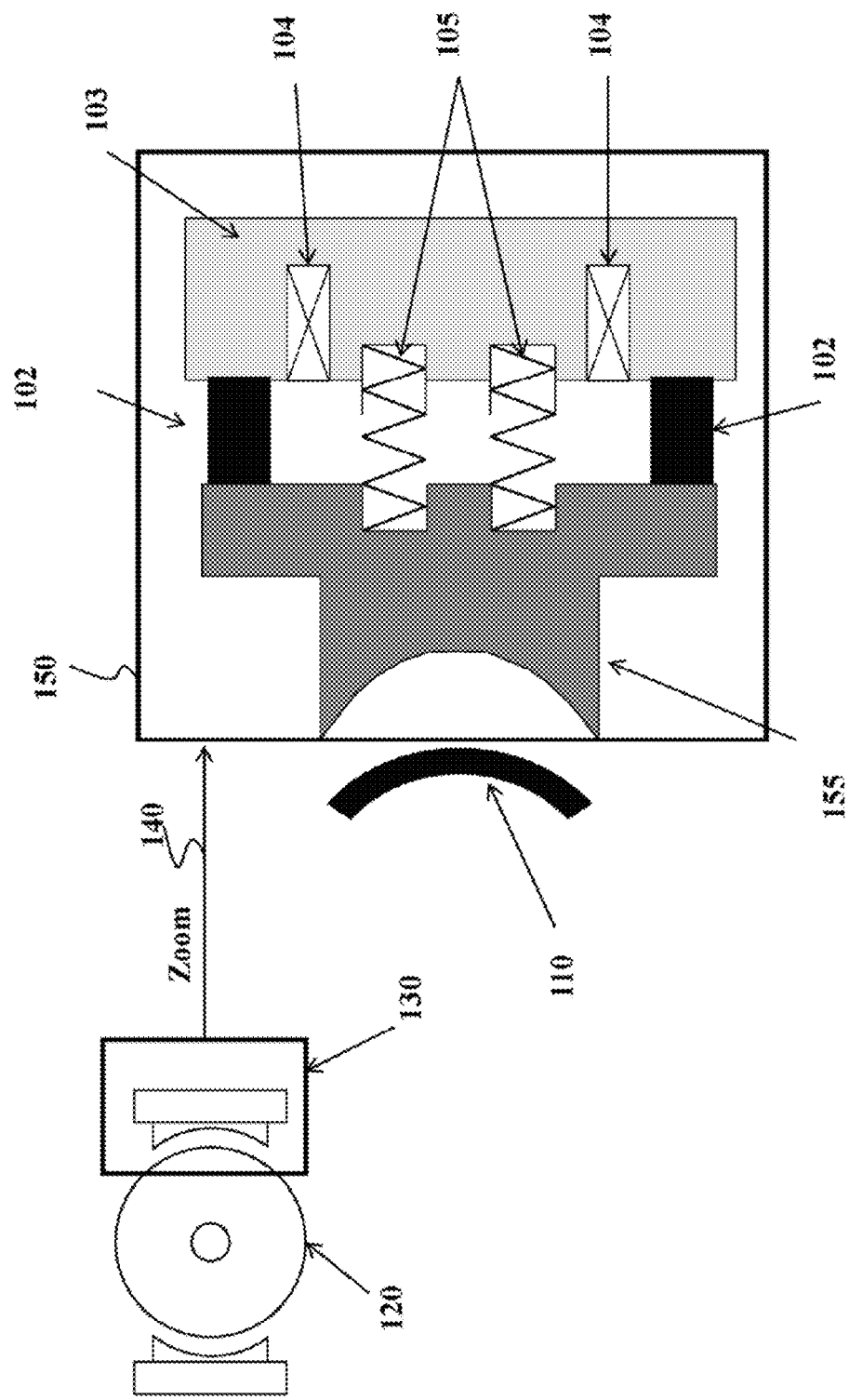
FIG. 1B is a schematic view of a conventional elevator brake system.
Figure 2:
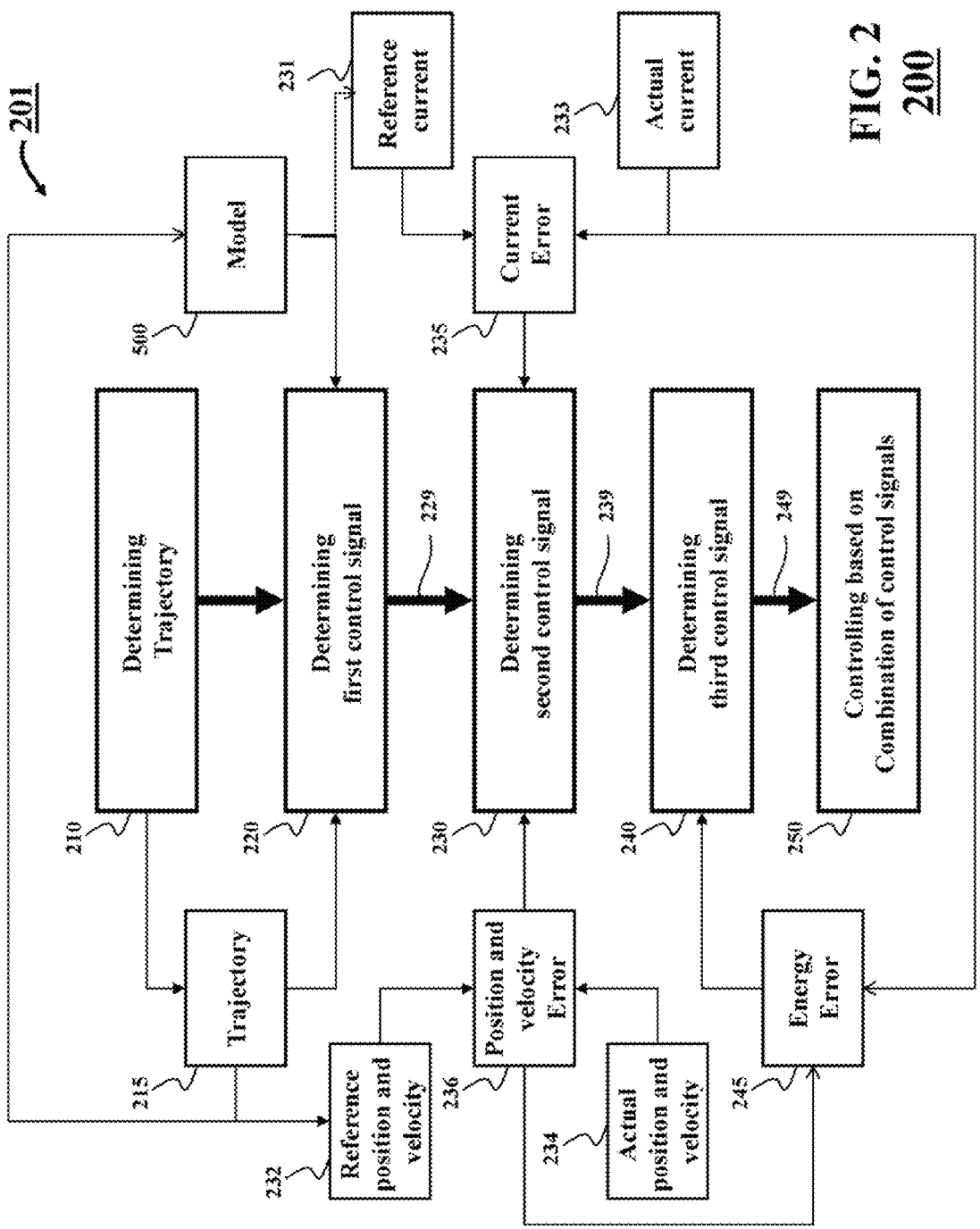
FIG. 2 is a block diagram of a method for controlling an actuator according to some embodiments of the invention.

FIG. 2 shows a block diagram of a method 200 for controlling an operation of an actuator according to some embodiments of an invention. The actuator can be suitable for usage in a break system of an elevator. However, the embodiments can control a moving element (ME) of various types of the actuators, e.g., electromagnetic actuators. Embodiments of the invention can be implemented using a processor 201.

The method 200 determines 210 a trajectory 215 of a position of the ME as a function of time and determines 220 a first control signal 229 based on a model of the actuator, e.g., a model 500, and the trajectory 215. The first control signal is determined to change a position of the ME according to the trajectory.

A second control signal 239 is determined 230 to compensate for a first component of an error of the operation due to an uncertainty of a model of the actuator system. For example, the second signal can be determined based on a position and velocity error 236 between a reference position and velocity 232 on the trajectory and an actual position and velocity 234 of the ME during the operation. In some embodiments, the second signal can also be determined based on a current error 235 between a reference current 231 of the coil associated with the first control signal and an actual current 233 of the coil measured during the operation.

A third control signal 249 is determined 240 to compensate for a second component of the error of the operation due to external disturbance on the actuator system, examples of external disturbances include friction as well as additive unknown disturbances. For example, the third control signal can be determined based on an energy error 245 between an actual energy of the actuator and the energy of the actuator operated by the first and the second control signal. In one embodiment this energy error is based on the position and velocity error 236 and the current error 235. For example, in one embodiment, the energy error is a bounded time-varying function. The operation of the actuator system is controlled 250 based on a combination of the first control signal, the second control signal, and the third control signal.

Figure 5:
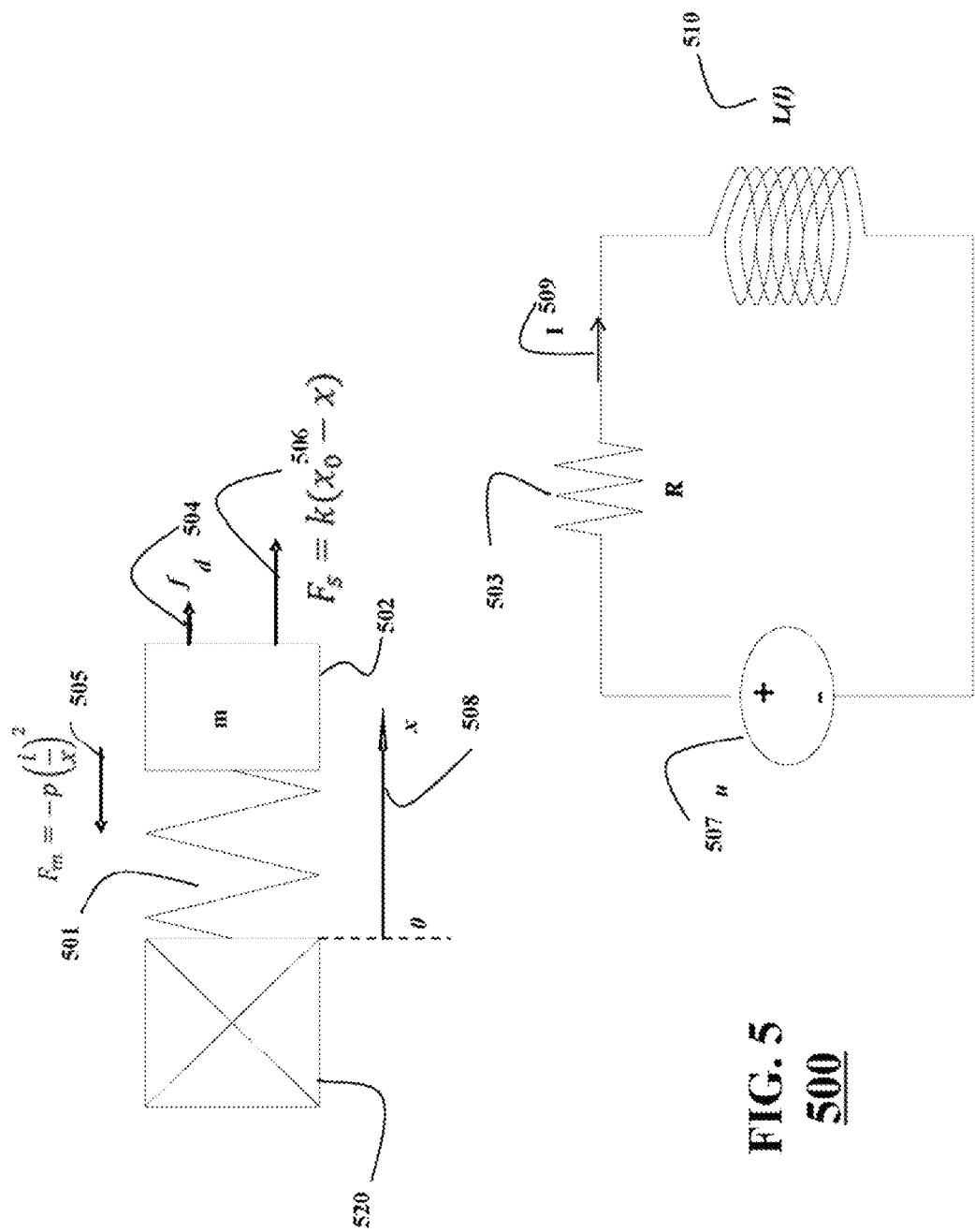
FIG. 5 is a schematic representation of a model of an electromagnetic brake system according to some embodiments of the invention.

FIG. 5 shows an example of the model 500 used by some embodiments of the invention. The model 500 is provided for illustration purposes and is not intended to limit the scope of the invention. According to the model 500, the mechanical part of the actuator is modeled by the differential equation according to $$m\frac{d^2 x}{dt^2} = k(x_o - x) - \eta \frac{dx}{dt} - p\left(\frac{i}{x}\right)^2 + f_d, \quad (1)$$

and the electrical part is modeled by the differential equation $$u = Ri + L\frac{di}{dt} - k_e \frac{dx}{dt}, \quad (2)$$

wherein x 503 represents a position of the moving element (ME) with zero being the position when the ME 502 is in contact with a casing 520 of the actuator, $$\frac{dx}{dt}$$

is a velocity of the ME and $$\frac{d^2 x}{dt^2}$$

is an acceleration of the ME, $x_0$ is an initial length of a spring 501, k is a constant of the spring constant defining a force $F_s$ 506 of the spring, $\eta$ is a viscous damping coefficient, m is a mass of the ME 502.

Current I 509 is the current circulating in the coil, $$\left(-p\left(\frac{i}{x}\right)^2\right)$$

is an electromotive force (EMF) 505, where p is the EMF constant, $f_d$ represents a friction as well as the additive unknown disturbances 504, u 507 is the voltage applied across the coil, R 508 is the resistance of the coil, L 510 is the coil inductance and $$\left[\left(-k\right)_e \frac{dx}{dt}\right]$$

is the back-EMF force, where $k_e(x,i)$ is the back-EMF varying term defined by $$k_e(x, i) = \frac{\partial L(x)}{\partial x} i.$$

Figure 3:
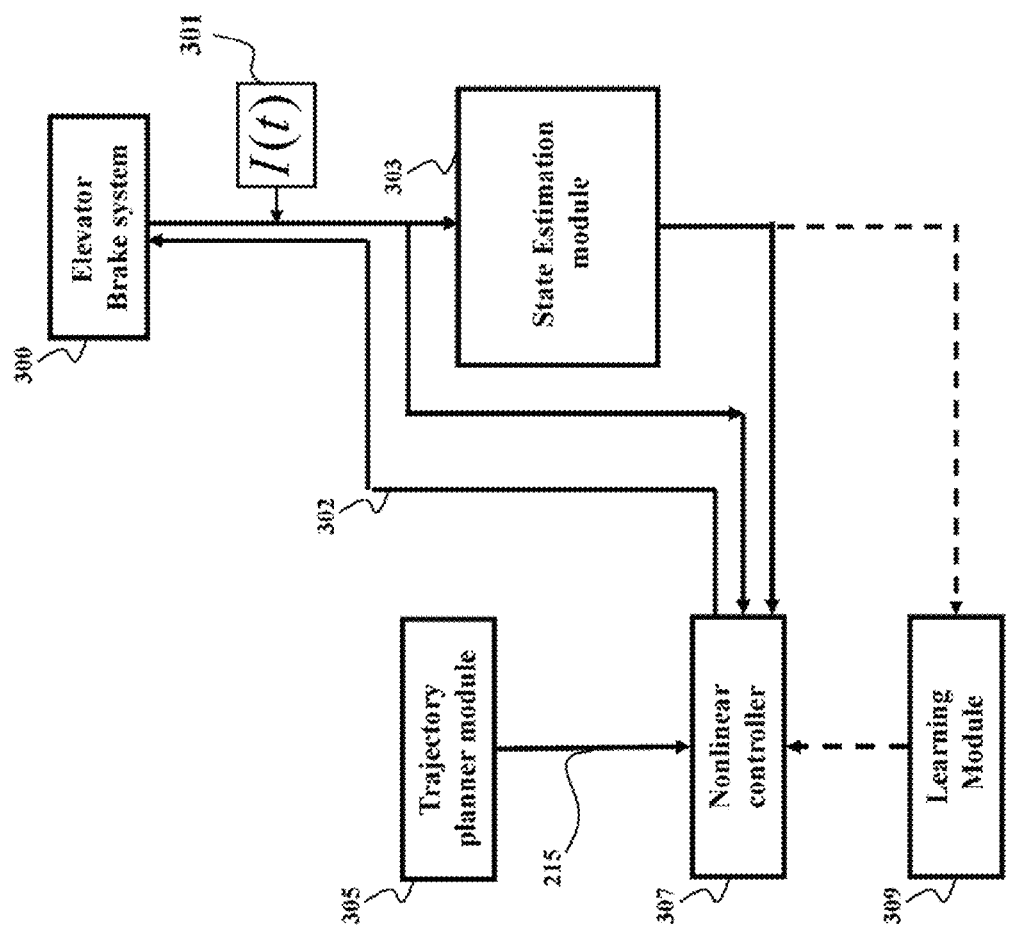
FIG. 3 is a block diagram of a system for controlling the actuator using the method of FIG. 2 according to some embodiments of the invention.

FIG. 3 shows a block diagram of a control system for controlling an operation of an electromagnetic actuator, e.g., an elevator break system 300. The control system includes a trajectory planner module 305 for determining the trajectory 215 and a state estimation module 303 for determining a velocity and a position of a ME of the actuator system during the operation of the break system 300. The control system also includes a nonlinear controller 307 for controlling the operation of the actuator system according the trajectory based on a combination of a feedforward signal, linear feedback signal and nonlinear feedback signal, as described below. The control system also includes a learning module 309 to adapt the nonlinear controller 307 to make the controller more robust to the elevator brake system 300 aging and uncertainties.

Trajectory Planner Module

Some embodiments of the invention are based on a realization that a problem of controlling the actuator, such as the actuator in the break system, can be transformed to a tracking problem, i.e., the ME can be controlled according to a trajectory of a position of the ME as a function of time. Hence, if the trajectory is determined such that initial values and final values of velocity and acceleration of the ME substantially equal to zero, and the motion according the trajectory is properly controlled then the motion of the ME can be smooth, the noise caused by of the break system can be reduced, and work life of the elements of the break system can be extended.

For example, in one embodiment, the trajectory planner module generates the trajectory by fitting a polynomial time function between an initial position and a final position of the ME according to $$x_{pref}(t)=C_5 t^5+C_4 t^4+C_3 t^3+C_2 t^2+C_1 t+C_0 \qquad (3)$$

Where the six coefficients $c_i$, i=0, ..., 5 are obtained by solving for the six constraints $$x_{pref}(t_0)=0 \; x_{pref}(t_f)=x_f$$

$$\dot{x}_{pref}(t_0)=0 \; \dot{x}_{pref}(t_f)=0$$

$$\ddot{x}_{pref}(t_0)=0 \; \ddot{x}_{pref}(t_f)=0. \qquad (4)$$

In Equation (4), $t_0$=0 [sec], $t_f$ is the desired duration and $x_f$ is the desired amplitude of the motion of the ME. The constraints imposed on the velocities and accelerations at the beginning and at the end of the motion result in a smooth start and smooth landing of the ME on the drum. The trajectory planner module can determine the trajectory in advance, or during the operation of the elevator break system.

Nonlinear Controller (NC)

The nonlinear controller 307 generates a control signal u(t) 302, e.g., a voltage applied to the coil of the actuator. The nonlinear controller includes various modules to compensate different type of uncertainties of the model of the actuator and conditions of operations. In one embodiments, the control signal includes a combination of three control signals.

Figure 4:
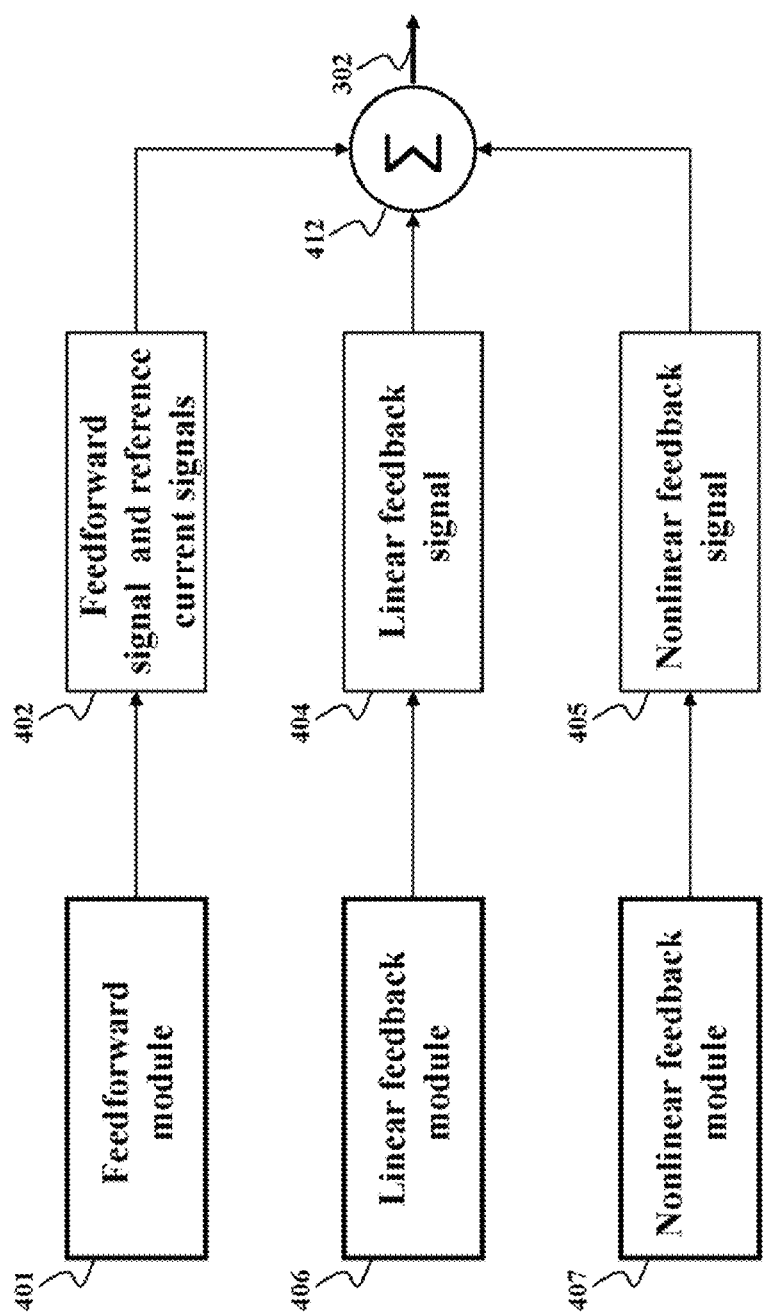
FIG. 4 is a block diagram of a nonlinear controller according to some embodiments of the invention.

FIG. 4 shows an example of the nonlinear controller according to one embodiment of the invention. For example, the nonlinear controller can include a feedforward module 401 for determining a first control signal, e.g., a feedforward signal $u_{ff}(t)$ 402 (the subscript ff stands for feedforward), based on a model of the actuator system and the trajectory. In various embodiments, the feedforward module determines the first control signal, such that under ideal conditions, the ME is in a reference position that follows the trajectory.

For example, in some embodiments, the feedforward module determines a desired coil reference current $i_{ref}(t)$ 402 associated with the first control signal. This desired coil reference current can be also used to determine a current error 235 for determining the second control signal 230 and the third control signal 240. Usually, the first control signal is determined based on a model of the actuator and the trajectory. For example, one embodiment inverts the model of the actuator to produce an invert model, which relates the trajectory to the first control signal. Accordingly, the first control signal is determined based on the trajectory and the invert model.

The controller can also include a linear feedback module 406 for determining a second control signal, e.g., a linear feedback signal $u_{lfb}(t)$ 404 (the subscript lfb stands for linear feedback), based on a position and velocity error 236 between the reference position on the trajectory and an actual position of the ME during the operation, and between the reference velocity on the trajectory and an actual velocity of the ME during the operation and a current error 235 between a reference current of the coil associated with the first feedforward control signal and an actual current of the coil measured during the operation. In some embodiments, the linear feedback module determines the second control signal to compensate for the error between the actual position of the ME and the reference position of the ME on the trajectory. Specifically, the linear feedback module compensate of the error due to uncertainty of the model of the actuator.

However, some embodiments are based on a realization that the error between the actual and reference position result not only due to uncertainties of the model, but also due to external disturbances, which is difficult to model or predict in advance. Moreover, it was realized that those external disturbances are nonlinear, and that is why, the linear feedback module is not optimal to compensate for those disturbances. But, the usage of the linear feedback module is advantageous, because its implementation is relatively simple, and can compensate for linear model uncertainty.

Therefore, in some embodiments, the controller includes a nonlinear feedback module 407 for determining a third control signal, e.g., a nonlinear feedback signal $u_{nlfb}(t)$ 405 (the subscript nlfb stands for nonlinear feedback). The nonlinear feedback module determines the third control signal to compensate for the error between the actual position of the ME and the reference position due to uncertainty of the external disturbance. For example, one embodiment is based on a realization that the energy of the actuator resulted from application of the first and the second signal does not result in a total actual energy of the actuator, and that difference in energy is due to the external disturbance.

Hence, one embodiment determines the position error due to external disturbance based on an energy error between an actual energy of the actuator and the energy of the actuator operated by the first and the second control signals. This embodiment is based on a further realization that external disturbance is bounded, and thus the energy difference also has an upper bound. Therefore, the upper bound of the energy difference, can be determined, e.g., offline, based on the operational conditions of the actuators, such that a upper bound energy function can be used in compensating for the position error.

Accordingly, the control signal u(t) 302 is a combination 412 of three control signals according to $$u(t)=u_{ff}(t)+u_{lfb}(t)+u_{nlfb}(t). \qquad (5)$$

The feedforward signal is generated by the 'nonlinear model inversion block' 401. This block uses the desired ME reference position and its derivative (i.e. the desired ME planned velocity) to compute a control signal $u_{ff}(t)$ and an associated desired coil current $i_{ref}(t)$ 403.

In one embodiment, the feedforward term is $$u_{ff}(t) = R i_{ref} + L\frac{d i_{ref}}{dt} - k_e \frac{d x_{pref}}{dt} + u_{ref}, \qquad (6)$$

where, $u_{ref}$ is an additive gain that we consider for now to be equal to zero and $$i_{ref}(t) = \sqrt{\frac{x_{pref}^2}{p\left(-m\frac{d^2 x_{pref}}{dt^2} + k(x_o - x_{pref}) - \eta \frac{d x_{pref}}{dt}\right)}} . \qquad (7)$$

The linear feedback term is $$u_{lfb}(t)=-(k_p \epsilon_x + k_d \dot{\epsilon}_x + k_i \epsilon_i), \qquad (8)$$

where $e_x = x_{pref} - \hat{x}_p$, $\dot{e}_x = x_{vref} - \hat{x}_v$, $e_i = i - i_{ref}$ and $k_p$, $k_d$, $k_i$ are positive gains.

Here, $x_{pref}$ is the reference trajectory of the position of the ME (ME), $$\frac{dx_{pref}}{dt}$$

is a reference velocity of the ME, $$\frac{d^2 x_{pref}}{dt^2}$$

is a reference acceleration of the ME, $x_o$ is an initial length of a spring of the actuator, k is a spring constant of a spring force $F_s$, η is a viscous damping coefficient, m is a mass of the ME, p is an electro-motive force (EMF) constant, u is a voltage applied across the coil of the actuator, R is a resistance of the coil, L is an inductance of the coil, t is the time instant and where $k_e(x, i)$ is the back-EMF varying term defined by $$k_e(x, i) = \frac{\partial L(x)}{\partial x} i,$$

$u_{lfb}$ is the second control signal, t is the instant of time, $e_x$ is the position error, $\dot{e}_x$ is the velocity error, $e_i$ is the current error defined as $e_x = x_{pref} - \hat{x}_p$, $\dot{e}_x = x_{vref} - \hat{x}_v$, $e_i = i - i_{ref}$, $\hat{x}_p$ is the estimated position, $\hat{x}_v$ is the estimated velocity, $i_{ref}$ is the current reference, and i is the actual current.

If the state vector is defined as $Z = (e_x, \dot{e}_x, e_i)$, then $u_{lfb}$ can be written as $$u_{lfb}(t) = -KZ^T, K = (k_p, k_d, k_i) \quad (9)$$

However, if two signals $u_{ff}$ and $u_{lfb}$ are added up and applied to the model of the brake system, e.g., as described by Equations (1) and (2), and the disturbance signal $f_d$ is equal to zero (i.e. neglected), an energy function of the brake system's model locally decreases over time, and the model controlled by the sum of the two signals $u_{ff}$ and $u_{lfb}$ asymptotically tracks the planned trajectory $x_{pref}$.

One example of such energy function V is $$V = \frac{ZZ^T}{2}. \quad (10)$$

For the system with no disturbances $f_d$, the time derivative of this energy function is $$\dot{V}_{nfd} = \frac{1}{2} Z(A + BK) Z^T < 0 \quad (11)$$

$$A = \begin{bmatrix} 0 & 1 & 0 \\ \frac{-k}{m} & \frac{\eta}{m} & \frac{p}{m} \\ 0 & \frac{k_e}{L} & \frac{-R}{L} \end{bmatrix}, B = \begin{bmatrix} 0 \\ 0 \\ \frac{-1}{L} \end{bmatrix}.$$

Various embodiments of the invention consider the disturbance of the system compensated by the nonlinear feedback model 407. Hence, some embodiments add to the two previous control signals a third control signal $u_{nlfb}$ for a non-zero disturbance function $f_d$. Accordingly, the time derivative of the energy function of the system under disturbance is $$\dot{V}_{fd} = \frac{1}{2} Z^T (A + BK) Z + Z^T B u_{nlfb} + Z^T \begin{bmatrix} 0 \\ \frac{-p}{m} \\ 0 \end{bmatrix} F(e_x, e_i), \quad (12)$$

$$\dot{V}_{fd} < Z^T B u_{nlfb} + Z^T \begin{bmatrix} 0 \\ \frac{-p}{m} \\ 0 \end{bmatrix} F(e_x, e_i),$$

where $$F(e_x, e_i) = p \left[ \left( \frac{i_{ref}}{x_{pref}} \right)^2 - \left( \frac{i}{x} \right)^2 + (i - i_{ref}) \right]. \quad (13)$$

It is not certain that this derivative of the energy function is negative, which means that it is not certain that the energy of the system is decreasing and thus it is not certain that the model of the system model tracks asymptotically the planned trajectory $x^{pref}$. Accordingly, to track the planned trajectory, some embodiments use the nonlinear feedback signal $$u_{nlfb}(t) = k_{fc} L sat(e_i) \|\dot{e}_x\| (\overline{F} + \epsilon), \quad (14)$$

where $k_{fc}$, $\overline{F}$, $\epsilon$ are positive gains, s.t.

$$\left\| \frac{p}{m} F(e_x, e_i) + \frac{f_d}{m} \right\| \leq \overline{F} \quad (15)$$

and $$sat(v) = \begin{cases} \frac{v}{\varepsilon} & \text{if } |v| \leq \varepsilon \\ \text{sgn}(v) & \text{if } |v| > \varepsilon \end{cases} \quad (16)$$

Where $\epsilon$ is a positive gain, and sgn(.) is the sign function $$\text{sgn}(v) = \begin{cases} 1 & \text{if } v > 0 \\ -1 & \text{if } v < 0 \end{cases}$$

In one embodiment, the derivative of the energy function of Equation (12) is $$\dot{V}_{fd} < (1 - k_{fc} \|e_i\|) \|\dot{e}_x\| \overline{F} - k_{fc} \|e_i\| \|\dot{e}_x\| \epsilon \quad (17)$$

The energy of the Equation (17) can be made negative by the selection of a sufficiently big positive gain $k_{fc}$ for any bounded error $\|e_i\|$.

State Estimation Module

Some embodiments of the invention are based on a realization that a model of the actuator can be used not only for controlling the actuator, but also for minimizing a number of sensors monitoring the operation of the actuator, and thus reducing the cost of installation and maintenance of the actuator. For example, in one embodiment, only one sensor 301 is used to sense a current I(t) of a coil of the actuator. The actual position and velocity of the ME, required for determining the voltage applied to the coil to track the planned trajectory, is determined based on the measured current and the model of the actuator. This embodiment reduces the cost of installation and maintenance of the brake system.

For example, the state estimation module 303 can estimate the position $x_{est}$ and corresponding velocity $v_{est} = \dot{x}_{est}$ of the ME according to $$\dot{x}_{est} \approx \frac{1}{k_e}\left(u - Ri - L\frac{di}{dt}\right) \quad (18)$$

$$x_{est} \approx \int v_{est} dt. \quad (19)$$

Learning Module

One of the difficulties in controlling the actuator is to ensure proper operation over time. For example, during the lifetime of the brake system, the successive brake closing and opening can cause, e.g., changes of the spring constants, as well as changes of the damping characteristics of the rubber cushions. Thus, some embodiments of the invention include a learning module 309 to update the controller online, i.e., during the operation of the actuator.

Figure 6:
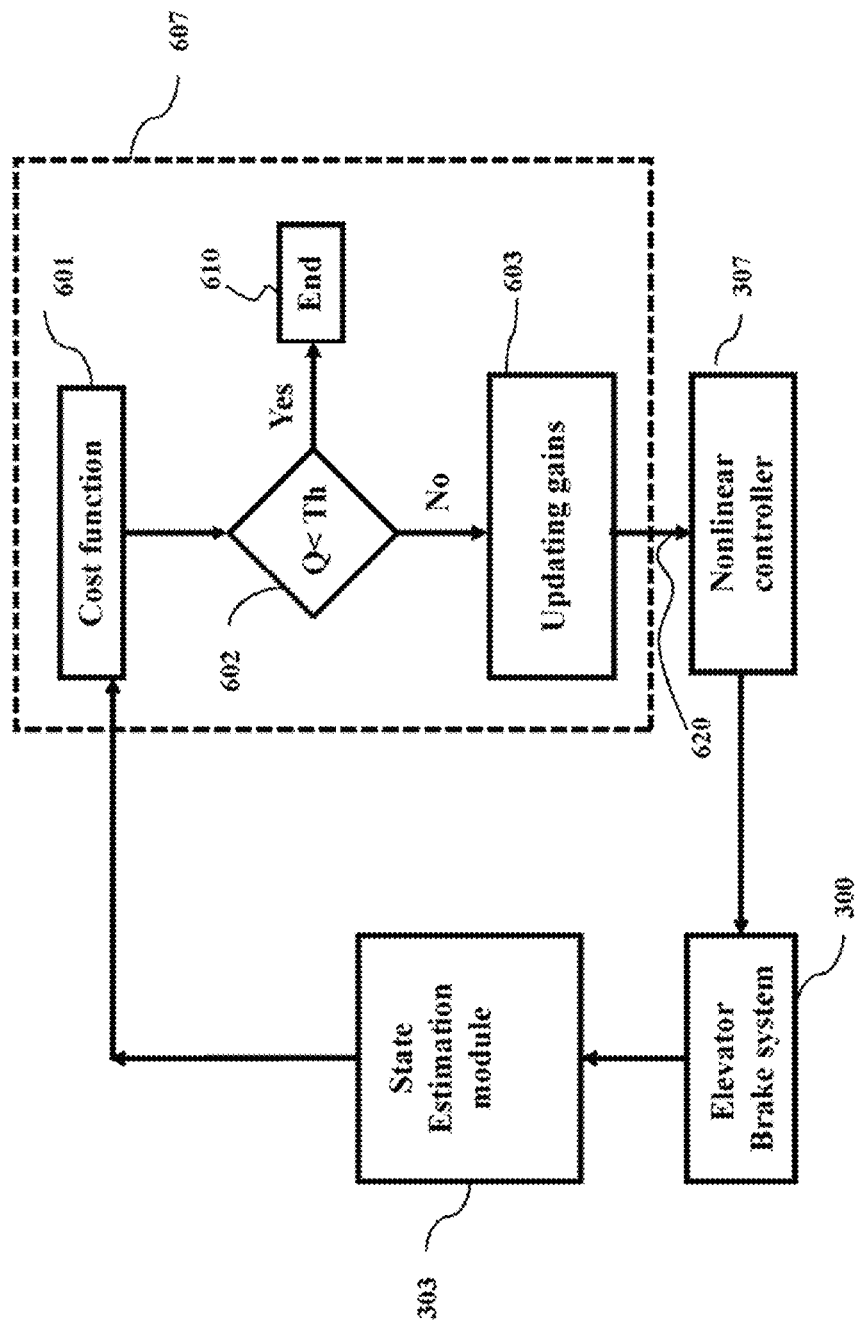
FIG. 6 a block diagram of a learning module according to some embodiments of the invention.

FIG. 6 shows a block diagram of a method used by the learning module for updating feedback gains of the nonlinear controller in response to the operation of the actuator. The update of the controller can minimize the noise and wear and tear of the brake system and improve the performance of the system.

In some embodiments, the learning module uses an extremum seeking (ES) module 607 to update the feedback gains and determined the controller coefficients, such as the coefficient $u_{ref}$ in Equation (6) used by the feedforward signal 402, the coefficients $k_p$, $k_d$ in Equation (8) used by the linear feedback signal 404, the coefficients $k_{fc}$, $\epsilon$ in Equation (14) used by the nonlinear feedback signal 405.

In one embodiment, an error between an actual output and a reference output of the actuator is represented with a cost function 601. For example, one variation of the embodiment discretizes time as time instants $t=kt_s$, where $k=0, 1, \ldots, n$ is the number of the brake opening-closing iterations, the cost function is $$Q[k]=C_1(v_{ref}[k]-v_{est}[k])^2+C_2(x_{ref}[k]-x_{est}[k])^2, \quad (20)$$

wherein Q[k] is a value of the cost function at the iteration k, $v_{est}=\dot{x}_{est}$, $v_{ref}=\dot{x}_{ref}$ and $C_1$, $C_2$ are two positive constants.

The cost function 601 is minimized 602 until 610 a value of the cost function is less than a threshold. The minimization of the cost function of Equation (20) minimizes the error between the actual ME velocity, e.g., measured or estimated via Equation (18), and the reference ME velocity, as well as the error between the actual ME position, e.g., measured or estimated via Equation (19), and the reference position of the ME.

Extremum seeking (ES) is a class of self-optimizing control strategies that can dynamically search for the unknown and/or time-varying inputs of a system for optimizing a certain performance index through the use of perturbation signals. In various embodiments, the performance index is the value of the cost function 601, and minimization of the cost function updates 603 feedback gains of the controller, such that the nonlinear controller 307 can be updated 620 accordingly.

The feedback gains of the controller are selected based on the system. For example, in one embodiment the feedback gains to compensate for at least one of the position error, the velocity error, a feedforward signal error, the energy error. In some embodiments, the feedback gains are updated independently under condition of convergence of extremum seeking.

For example, the feedback gains can be selected as $$\beta_1=\Delta k_p, \beta_2=\Delta k_d, \beta_3=\Delta u_{ref}, \beta_4=\Delta\epsilon, \beta_5=\Delta k_{fc}, \quad (21)$$

where, $\Delta k_p$ is an update for the position error gain $k_p$, $\Delta k_d$ is an update for the velocity error gain $k_d$, $\Delta u_{ref}$ is an update for the feedforward signal, and $\Delta\epsilon$, $\Delta k_{fc}$ are the updated of the gains $\epsilon, k_{fc}$ appearing in the nonlinear feedback signal given by equation (14).

Thus, some embodiments update the feedback gains based on the relations:

$$k_p = k_{p(nominal)} + \Delta k_p,$$

$$k_d = k_{d_{nominal}} + \Delta k_d,$$

$$u_{ref} = u_{ref_{nominal}} + u_{ref},$$

$$\epsilon = \epsilon_{nominal} + \Delta\epsilon,$$

$$k_{fc} = k_{fc_{nominal}} + \Delta k_{fc}, \quad (22)$$

wherein $k_{p(nominal)}, k_{d_{nominal}}, u_{ref_{nominal}}, \epsilon_{nominal}$ and $k_{fc_{nominal}}$ are positive nominal values of the updated gains, e.g., dynamically selected or predetermined, e.g., zero.

The feedback gains $\beta_i$, $i=1, \ldots, 5$ according to one embodiment, are updated 603 based on a perturbation signal according to $$y_i[k+1]=y_i[k]+a_i\Delta T \sin(\omega_i k\Delta T+\phi)Q[k]$$

$$\beta_i[k]=y_i[k]+a_i \sin(\omega_i k\Delta T+\phi), \text{ for } i=1, \ldots 5, \quad (23)$$

where $y_i[k]$ is a value of an intermediate integration variable at iteration k, $\Delta T$ is a sampling time, i.e. $t=k\Delta T$, $a_i \sin(\omega_i i k\Delta T+\phi)$ is the perturbation signal, defined by a sinusoid function with amplitude $a_i$, a frequency $\omega_i$, and a phase $\phi$, Q[k] the value of the cost function at iteration k and $\beta_i[k]$ is the value of the updated feedback gain $\beta_i$ at the iteration k.

To insure convergence of the extremum seeking, some embodiments select the frequencies $\omega_i$ for $i=1, \ldots 5$, to satisfy the convergence condition $$\omega_p + \omega_q \neq \omega_r, p, q, r=1, \ldots 5. \quad (24)$$

According to the condition of convergence, a sum of a first frequency of a first perturbation signal and a second frequency of a second perturbation signal of the set is not equal to a third frequency of a third perturbation signal, as described in Equation (24).

Updating Model of System Using Extremum Seeking

Figure 7:
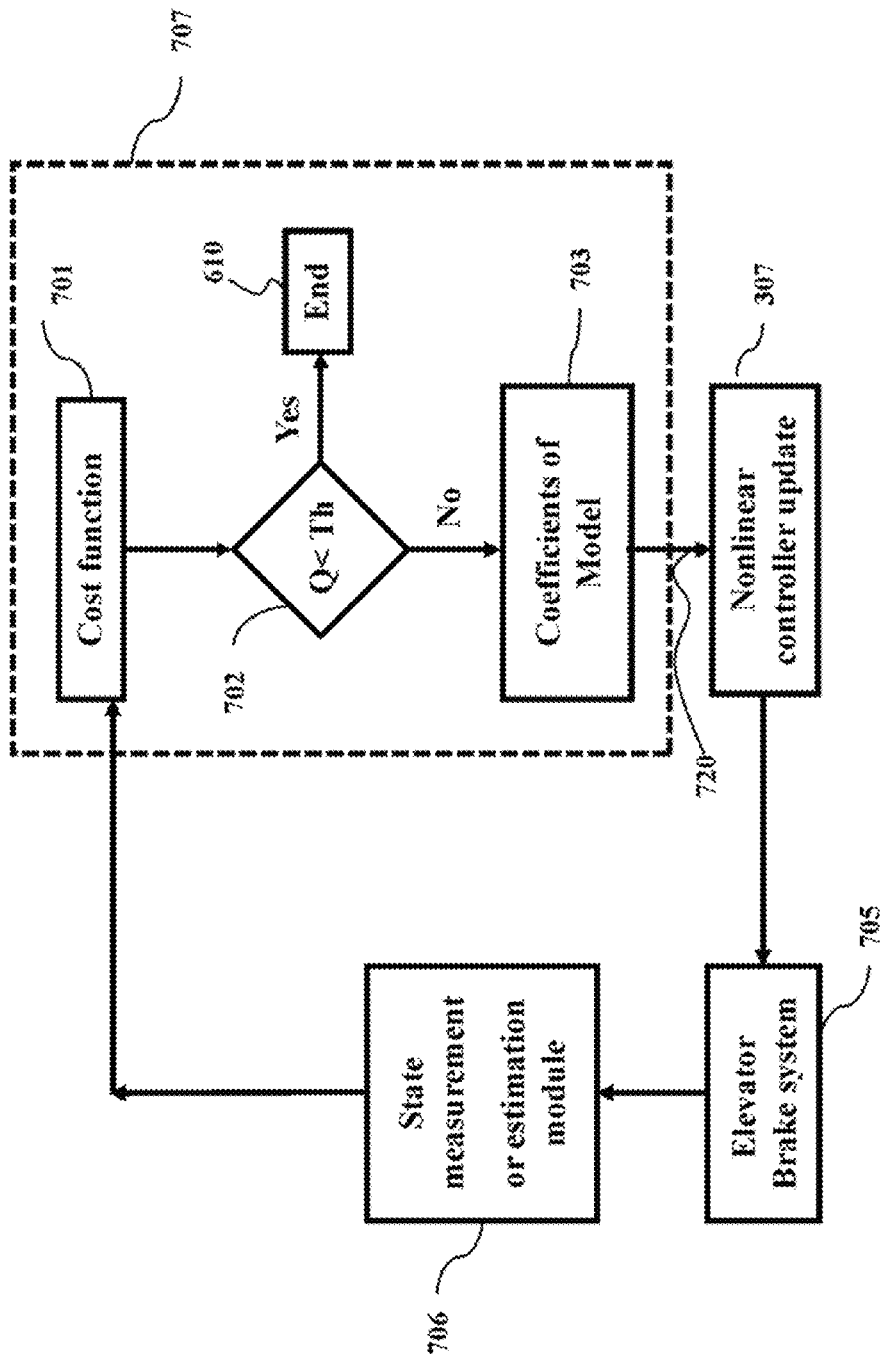
FIG. 7 a block diagram of a learning module according to some embodiments of the invention.

FIG. 7 shows a block diagram of a method 700 according to another embodiment that modifies the model of the system and then uses the modified model to update the nonlinear controller. Usually, ES is a non-model based control strategy, i.e., a model for the controlled system is not necessary for extremum seeking to optimize the system. However, some embodiments of the invention are based on a realization that is advantageous to use extremum seeking to update the model of a system.

Accordingly, in these embodiments, the extremum seeking module 707, additionally or alternatively to determining gain factors, determines coefficients of the model of the actuator, e.g., the model described by Equations (1) and (2). This embodiment is advantageous, because usage of up-to-date model increase accuracy of the tracking and, thus, increases the efficiency of controlling the actuator.

Another advantage of updating the coefficients of the model of the controller over the updating the feedback gains of the controller is that the feedback gains of the controller implies a certain robustness of the controller to the system changes. However, the feedback gains can only compensate for the system changes to some extent, i.e., if the systems parameters change too far from the original system (due for example to a premature aging of the system's components), then the update to the feedback gains cannot optimally compensate for these changes.

Accordingly, some embodiments of the invention update a model of the system based on an extremum seeking. For example, in one embodiment, the learning module includes an extremum seeking module 707 to update the coefficients 703 of the model of the actuator. The learning module, determines the coefficients of the model in real time or offline, and tracks the system changes directly at the model level, not the control gains. After the model is updated 703, the new model is used to update 720 the nonlinear controller 307. In this embodiment, the gains and structure of the controller remain unchanged, but the model used to derive the controller is updated and, thus, the controller is updated as well.

For example, some embodiments still minimizes the cost function 701 defined by Equation (20), however, parameters $x_{pref}$ and $x_{est}$ can vary in dependence of the system. For example, $x_{pref}$ can be a reference state of the system and $x_{est}$ can be an actual state of the system. The cost function 701 is minimized 702 until 710 a value of the cost function is less then a threshold. However, the learning parameters are the coefficients of the model with uncertain values, e.g., the values that are difficult to estimate or the values are changing over time.

For example, one embodiment uses the coefficients defined by $$\beta_1 = \Delta k, \ \beta_2 = \Delta \eta, \ \beta_3 = \Delta f_d \quad (25)$$

where $\Delta k$ is an update of the spring constant coefficient k, $\Delta \eta$ is an update of the damping coefficient $\eta$, and $\Delta f_d$ is an update of the friction and disturbances forces $f_d$. The selected coefficients can be updated based on the relations:

$$k = k_{nom} + \Delta k$$

$$\eta = \eta_{nom} + \Delta \eta$$

$$f_d = \Delta f_d, \quad (26)$$

wherein, $k = k_{nom}$, $\eta_{nom}$ are nominal values of the updated coefficients. The nominal values can be obtained f by a first experimental estimation of the model parameters or predetermined. For example, the nominal value can be fixed to zero, e.g. $f_{d_{nominal}} = 0$ in equation (26).

The coefficients $\beta_i$, $i = 1, \ldots, n$ of the model are updated 703 based on a perturbation signal according to $$y_i[k+1] = y_i[k] + a_i \Delta T \sin(\omega_i k \Delta T + \phi) Q[k]$$

$$\beta_i[k] = y_i[k] + a_i \sin(\omega_i k \Delta T + \phi), \text{ for } i = 1, \ldots, n, \quad (27)$$

wherein $y_i[k]$ is the value of an intermediate integration variable at iteration k, $\Delta T$ is the sampling time, i.e. $t = k \Delta T$, $a_i$ i $\sin(\omega_i i k \Delta T + \phi)$ is the perturbation signal, defined by a sinusoid function with an amplitude $a_i$, a frequency $\omega_i$, and a phase $\phi$, Q[k] is the value of the cost function at iteration k and $\beta_i[k]$ is the value of the updated coefficient $\beta_i$ at the iteration k.

To insure convergence of the extremum seeking, some embodiments select the frequencies $\omega_i$ for $i = 1, \ldots n$, to satisfy the convergence condition $$\omega_p + \omega_q \neq \omega_r, \ p, q, r = 1, \ldots n, \quad (28)$$

wherein n is a number of perturbation signals. Typically the number of the perturbation signals corresponds to a number of coefficients to be updated, e.g., three in the example above.

In some embodiments, the model is 703 at each opening/closing cycle of the brake system, e.g., using Equation (27) to (28), and at each cycle, i.e. each new value for the parameters, the nonlinear controller is updated based on the updated model.

In various embodiments, the coefficients of the model of the system to be updated are selected based on a type of the system and its operations. In one embodiment the nonlinear controller is given by the sum of three modules of the controller, as shown in FIG. 4. In this case, after the model is updated, the feedforward control term 401 is re-determined based on Equations (6), (7) with $u_{ref}$ being replaced by the learned parameter $f_d$ in Equation (6). The linear feedback term 406 is updated based on the new current reference signal 231 associated with the updated model, and the nonlinear feedback term 407 is also updated based on the new current reference signal 231.

Figure 8:
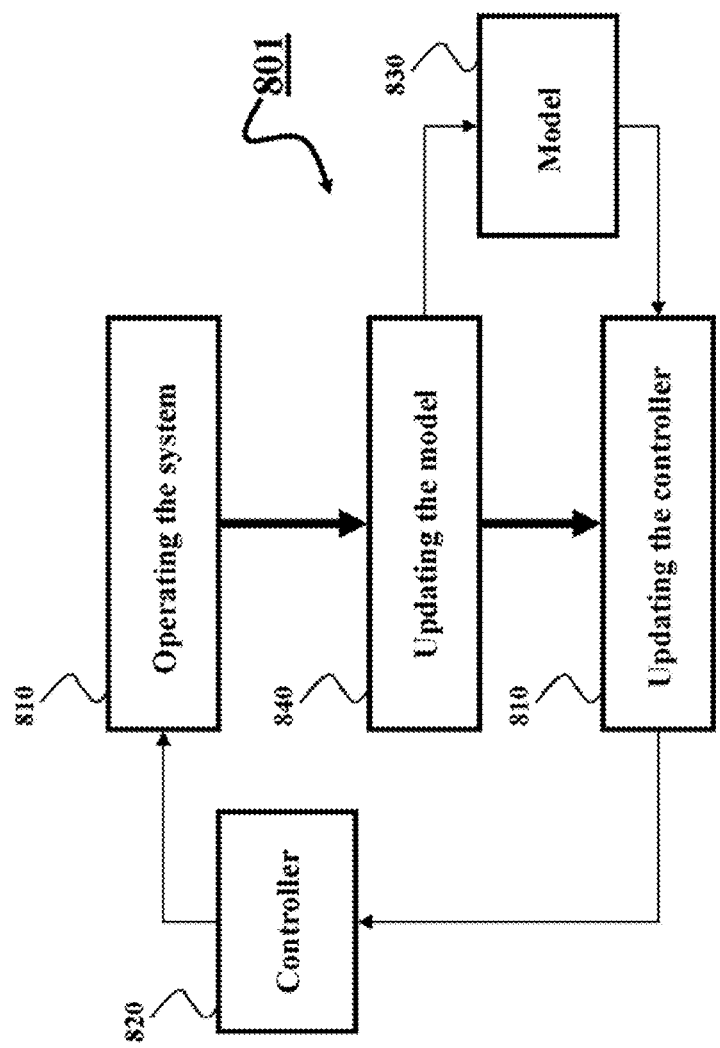
FIG. 8 a block diagram of a method for controlling an operation of a system according to some embodiments of the invention.

FIG. 8 shows a method for controlling an operation of a system according to some embodiments. Steps of the method are performed by a processor 801. The system is operated 810 by a controller 820, e.g., a non-linear controller 307. The controller 820 is a model-based controller determined according to a model 830 of the system, e.g., the model 500.

During the operation, the model is updated 840 based on an extremum seeking. For example, coefficients of the model are updated in response to the perturbation of the operation. Next, the controller 820 is updated 850 based on the updated model 830. Update of the controller can include update of the gains of the controller or redetermination of the controller based on the updated model. In some embodiments, updating the model and the controller are preformed iteratively during some periods or entire operation of the system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A controller for controlling an operation of a system, comprising:
a processor for executing a learning module, wherein the learning module updates a model of the system using an extremum seeking, wherein the learning module
determines a value Q[k] of a cost function at an iteration k, according to $$Q[k]=C_1(\dot{x}_{ref}[k]-\dot{x}_{est}[k])^2+C_2(x_{ref}[k]-x_{est}[k])^2,$$

wherein $C_1$, and $C_2$ are positive constants, $x_{ref}$ is a reference state of the system and $x_{est}$ is an actual state of the system; and
determines a coefficient $\beta_i$ of the model according to $$y_i[k+1]=y_i[k]+a_i\Delta T\sin(\omega_i k\Delta T+\phi)Q[k]$$

$$\beta_i[k]=y_i[k]+a_i\sin(\omega_i k\Delta T+\phi), \text{ for } i=1,\ldots n,$$

wherein $y_i[k]$ is the value of an intermediate integration variable at the iteration k, $\Delta T$ is a sampling time, i.e. $t=k\Delta T$, $a_i\sin(\omega_i k\Delta T+\phi)$ is a perturbation signal, wherein the perturbation signal is a sinusoid function with an amplitude $a_i$, a frequency $\omega_i$, and a phase $\phi$, $i=1,\ldots n$, n is a number of perturbation signals and $\beta_i[k]$ is a value of the coefficient $\beta_i$ at the iteration k.

2. The controller of claim 1, wherein the learning module minimizes a cost function representing an error between an actual and a desired output of the system; and
updates the model based on a value of the minimized cost function and a perturbation signal.

3. The controller of claim 1, wherein the learning module updates the model iteratively during the operation of the system.

4. A method for controlling an operation of a system, comprising:
determining a value Q[k] of a cost function at an iteration k, according to $$Q[k]=C_1(\dot{x}_{ref}[k]-\dot{x}_{est}[k])^2+C_2(x_{ref}[k]-x_{est}[k])^2,$$

wherein $C_1$, and $C_2$ are positive constants, $x_{ref}$ is a reference state of the system and $x_{est}$ is an actual state of the system;
determining a coefficient $\beta_i$ of the model according to $$y_i[k+1]=y_i[k]+a_i\Delta T\sin(\omega_i k\Delta T+\phi)Q[k]$$

$$\beta_i[k]=y_i[k]+a_i\sin(\omega_i k\Delta T+\phi), \text{ for } i=1,\ldots n,$$

wherein $y_i[k]$ is the value of an intermediate integration variable at the iteration k, $\Delta T$ is a sampling time, i.e. $t=k\Delta T$, $a_i\sin(\omega_i k\Delta T+\phi)$ is a perturbation signal, wherein the perturbation signal is a sinusoid function with an amplitude $a_i$, a frequency $\omega_i$, and a phase $\phi$, $i=1,\ldots n$, n is a number of perturbation signals and $\beta_i[k]$ is a value of the coefficient $\beta_i$ at the iteration k; and
updating the coefficient $\beta_i$ the model of the system, wherein steps of the method are performed by a processor.

5. The method of claim 4, further comprising:
updating a controller operating the system based on the updated model.

6. The method of claim 5, further comprising:
updating the model and the controller iteratively during the operation of the system.

7. A method for controlling an operation of a system, comprising:
operating the system by a controller, wherein the controller is model-based controller determined according to a model of the system;
updating the model, during the operation, based on an extremum seeking, comprising:
determining a value Q[k] of a cost function at an iteration k, according to $$Q[k]=C_1(\dot{x}_{ref}[k]-\dot{x}_{est}[k])^2+C_2(x_{ref}[k]-x_{est}[k])^2,$$

wherein $C_1$, and $C_2$ are positive constants, $x_{ref}$ is a reference state of the system and $x_{est}$ is an actual state of the system; and
determining the coefficient $\beta_i$ the model according to $$y_i[k+1]=y_i[k]+a_i\Delta T\sin(\omega_i k\Delta T+\phi)Q[k]$$

$$\beta_i[k]=y_i[k]+a_i\sin(\omega_i k\Delta T+\phi), \text{ for } i=1,\ldots n,$$

wherein $y_i[k]$ is the value of an intermediate integration variable at the iteration k, $\Delta T$ is a sampling time, i.e. $t=k\Delta T$, $a_i\sin(\omega_i k\Delta T+\phi)$ is a perturbation signal, wherein the perturbation signal is a sinusoid function with an amplitude $a_i$, a frequency $\omega_i$, and a phase $\phi$, $i=1,\ldots n$, n is a number of perturbation signals and $\beta_i[k]$ is a value of the coefficient $\beta_i$ at the iteration k; and
updating the controller based on the updated model, wherein steps of the method are performed by a processor.

8. The method of claim 7, wherein the system is a break system including an actuator having a moving element, and wherein the reference state is a reference position of the moving element, and the actual state is an actual position of the moving element.

* * * * *